(12) United States Patent
Waycuilis (10) Patent No.: US 7,511,180 B2
(45) Date of Patent: *Mar. 31, 2009

(54) STABILIZING PETROLEUM LIQUIDS FOR STORAGE OR TRANSPORT

(75) Inventor: John J. Waycuilis, Cypress, TX (US)

(73) Assignee: Marathon Oil Company, Houston, TX (US)

(*) Notice: Subject to any disclaimer, the term of this patent is extended or adjusted under 35 U.S.C. 154(b) by 863 days.

This patent is subject to a terminal disclaimer.

(21) Appl. No.: 10/718,249

(22) Filed: Nov. 19, 2003

(65) Prior Publication Data

US 2004/0162452 A1    Aug. 19, 2004

Related U.S. Application Data

(63) Continuation-in-part of application No. 09/877,798, filed on Jun. 8, 2001, now Pat. No. 6,703,534, which is a continuation-in-part of application No. 09/476,297, filed on Dec. 30, 1999, now Pat. No. 6,350,928.

(51) Int. Cl.
C07C 9/00 (2006.01)
F17C 7/00 (2006.01)

(52) U.S. Cl. ............... 585/15; 208/308; 208/340; 208/368

(58) Field of Classification Search ............ 585/15; 208/340, 368
See application file for complete search history.

(56) References Cited

U.S. PATENT DOCUMENTS

| | | | | |
|---|---|---|---|---|
| 2,475,255 A | 7/1949 | Rollman | ............... | 62/170 |
| 3,514,274 A | 5/1970 | Cahn et al. | ............... | 585/15 |
| 3,991,816 A | 11/1976 | Klaren | ............... | 165/1 |
| 4,220,193 A | 9/1980 | Klaren | ............... | 165/1 |
| 4,398,594 A | 8/1983 | Klaren | ............... | 165/104.16 |
| 5,351,756 A | 10/1994 | Minkkinen et al. | ............... | 166/267 |

(Continued)

FOREIGN PATENT DOCUMENTS

WO     WO9827033 A1     6/1998    ............... 7/20

(Continued)

OTHER PUBLICATIONS

J. S. Gudmundsson et al., "Hydrate Concept for Capturing Associated Gas", SPE 50598, pp. 247-257, presented at 1998 SPE European Petroleum Conference, Oct. 20-22, 1998.

(Continued)

*Primary Examiner*—Ellen M. McAvoy
(74) *Attorney, Agent, or Firm*—Jack E. Ebel; Rodney F. Brown (57) ABSTRACT

A process is provided for stabilizing a petroleum liquid feed stream which contains a more volatile hydrocarbon portion, a less volatile hydrocarbon portion and water. The more volatile hydrocarbon portion of the petroleum liquid feed stream is reacted with the water in a fluidized bed heat exchanger to form a solid hydrate and a petroleum liquid product which contains the remaining less volatile hydrocarbon portion of the petroleum liquid feed stream. The petroleum liquid product is separated from the solid hydrate to recover the resulting petroleum liquid product which is substantially less volatile and more stable than the petroleum liquid feed stream and more suitable for storage or transport, particularly at low pressures.

39 Claims, 3 Drawing Sheets

U.S. PATENT DOCUMENTS

| | | | |
|---|---|---|---|
| 5,473,904 A | 12/1995 | Guo et al. | 62/46.1 |
| 5,536,893 A | 7/1996 | Gudmundsson | 585/15 |
| 5,941,096 A | 8/1999 | Gudmundsson | 62/633 |
| 6,082,118 A | 7/2000 | Endrizzi et al. | 62/46.1 |
| 6,180,843 B1 | 1/2001 | Heinemann et al. | 585/15 |
| 6,245,955 B1 | 6/2001 | Smith | 585/15 |
| 6,313,361 B1 | 11/2001 | Waycuilis | 585/314 |
| 6,350,928 B1 | 2/2002 | Waycuilis et al. | 585/15 |
| 6,703,534 B2 * | 3/2004 | Waycuilis et al. | 585/15 |

FOREIGN PATENT DOCUMENTS

| | | | |
|---|---|---|---|
| WO | WO9919282 A1 | 4/1999 | 7/20 |

OTHER PUBLICATIONS

BG Hydrates Workshop, Gas Research Technology Centre, May 24-25, 1999.

J. S. Gudmundsson et al., "NGH on FPSO—Slurry Process and Cost Estimate", SPE 56629, presented at 1999 SPE Annual Technical Conference, Oct. 3-6, 1999.

"Fluidized-Bed Heat Exchanger Avoids Fouling Problems", Chemical Engineering, Feb. 1988, p. 43.

Klaren et al., "The Non-Fouling Fluidized Bed Heat Exchanger", American Society of Mechanical Engineers, Heat Transfer Equipments Fundamentals, Design, Applications and Operating Problems, vol. 108, Book No. H00500, Jan. 1989, p. 273-279.

"Consider Nonfouling Fluidized Bed Exchangers", Hydrocarbon Processing, Jul. 1989, pp. 48-50.

* cited by examiner

STABILIZING PETROLEUM LIQUIDS FOR STORAGE OR TRANSPORT

This is a continuation-in-part application of Ser. No. 09/877,798 filed on Jun. 8, 2001 now U.S. Pat. No. 6,703,534, which is a continuation-in-part application of Ser. No. 09/476,297 filed on Dec. 30, 1999, and now issued as U.S. Pat. No. 6,350,928.

TECHNICAL FIELD

The present invention relates generally to the storage or transport of petroleum liquids and, more particularly, to a process for stabilizing a petroleum liquid in advance of storing or transporting the petroleum liquid by combining a volatile component of the petroleum liquid with water to form a solid hydrate which is removed from the petroleum liquid.

BACKGROUND OF THE INVENTION

Petroleum liquids, such as crude oil, typically contain a number of relatively volatile components when produced to surface wellheads via wells extending into subterranean hydrocarbon-bearing formations. Relatively volatile components in the petroleum liquids may include low molecular weight hydrocarbons, such as methane, ethane, propane and butanes, and/or non-hydrocarbon impurities, such as carbon dioxide and hydrogen sulfide. The presence of such components in a petroleum liquid can significantly increase the volatility of the petroleum liquid as evidenced by elevated vapor pressure values.

Relatively volatile components tend to undesirably evolve as vapors from a petroleum liquid having a high vapor pressure when the petroleum liquid is stored or transported at ambient atmospheric pressure. The evolving vapors have a number of deleterious effects. For example, the vapors are highly flammable which creates a safety risk. The vapors also contribute to air pollution, which creates a health risk. The vapors may even be toxic, particularly if they contain hydrogen sulfide, which exacerbates the health risk. As such, petroleum liquids having high vapor pressures are often deemed unstable for storage or transport purposes.

It is apparent that a need exists for an effective method of stabilizing a petroleum liquid produced from a well to diminish the health and safety risks associated with vapors evolving from the petroleum liquid before the petroleum liquid is suitable for storage or transport. Accordingly, it is an object of the present invention to provide an effective process for stabilizing a petroleum liquid. More particularly, it is an object of the present invention to provide a process for stabilizing a petroleum liquid by reducing the vapor pressure of the petroleum liquid. Still more particularly, it is an object of the present invention to provide a process for stabilizing a petroleum liquid by removing volatile components from the petroleum liquid. It is another object of the present invention to provide such a petroleum liquid stabilization process, which enables storing or transporting the petroleum liquid, even at relatively low pressures, with diminished health and safety risks. It is yet another object of the present invention to provide such a petroleum liquid stabilization process, which is can be practiced in a cost-effective manner. It is a further object of the present invention to provide such a petroleum liquid stabilization process, which is can be practiced in an environmentally attractive manner. It is still a further object of the present invention to provide such a petroleum liquid stabilization process, which is can be practiced by means of compact, low-cost, and low-maintenance equipment. It is yet a further object of the present invention to provide such a petroleum liquid stabilization process, which is can be practiced by means of equipment suitable for operation in remote oil field environments. These objects and others are achieved in accordance with the invention described hereafter.

SUMMARY OF THE INVENTION

The present invention is a process for stabilizing a petroleum liquid. A petroleum liquid feed stream is provided which includes a more volatile hydrocarbon portion, a less volatile hydrocarbon portion and water. A preferred more volatile hydrocarbon portion comprises a compound or a mixture of compounds, each having four or less carbon atoms. A preferred less volatile hydrocarbon portion comprises a compound or a mixture of compounds, each having five or more carbon atoms. A preferred petroleum liquid feed stream is crude oil. The petroleum liquid feed stream also optionally includes a hydrate-forming non-hydrocarbon portion. A preferred hydrate-forming non-hydrocarbon portion comprises a compound selected from a group consisting of hydrogen sulfide, carbon dioxide, and mixtures thereof.

The petroleum liquid feed stream is cooled to a temperature below a hydrate formation temperature, which causes at least part of the more volatile hydrocarbon portion and the water to form a hydrate. In addition a petroleum liquid product is formed which comprises at least part of the less volatile hydrocarbon portion. If a hydrate-forming non-hydrocarbon portion is included in the petroleum liquid feed stream, the process further comprises forming the hydrate from at least part of the hydrate-forming non-hydrocarbon portion and the water. The hydrate is separated from the petroleum liquid product. The resulting petroleum liquid product is less volatile than the petroleum liquid feed stream and more suitable for storage or transport at low pressures.

In accordance with a specific embodiment of the present invention, the process is initiated by entraining an abrasive inert solid particle medium in the petroleum liquid feed stream to form a fluidizable mixture. The fluidizable mixture is conveyed through the interior of a heat transfer tube which is enclosed within a shell. A heat transfer medium resides within the shell, but is external to the heat transfer tube in fluid isolation from the fluidizable mixture. The wall of the heat transfer tube provides a heat transfer surface for heat exchange between the petroleum liquid feed stream and the heat transfer medium which is cooler than the petroleum liquid feed stream. When the petroleum liquid feed stream contacts the tube wall, the petroleum liquid feed stream is cooled to a temperature below the hydrate formation temperature. Consequently, at least part of the more volatile hydrocarbon portion and the water in the petroleum liquid feed stream are converted to a plurality of solid hydrate particles. The solid particle medium substantially prevents accumulation of the solid hydrate particles on the tube wall, maintaining the plurality of solid hydrate particles in an unconsolidated condition within the fluidizable mixture. The fluidizable mixture, including the plurality of solid hydrate particles, is separated from the solid particle medium to recover the petroleum liquid product having the hydrate suspended therein. The hydrate is then separated from the petroleum liquid product.

In accordance with a more specific embodiment of the present invention, the petroleum liquid stabilization process utilizes a fluidized bed heat exchanger having a shell enclosing a heat transfer medium flowpath, a fluidizable mixture flowpath in fluid isolation from the heat transfer medium flowpath, a heat transfer surface in heat communication with the heat transfer medium flowpath and fluidizable mixture flowpath, and an internal downcomer. The portion of the shell enclosing the heat transfer surface defines a heat transfer zone. The heat transfer medium is conveyed through the heat transfer medium flowpath to cool the heat transfer surface. The fluidizable mixture is simultaneously conveyed through the fluidizable mixture flowpath and is cooled upon contact with the heat transfer surface to form the plurality of solid hydrate particles. The fluidizable mixture, including the solid hydrate particles, is withdrawn from the heat transfer zone and the solid hydrate particles are separated from the solid particle medium to recover the petroleum liquid product having the hydrate suspended therein. The hydrate is then separated from the petroleum liquid product and the solid particle medium is returned to the heat transfer zone via the internal downcomer.

In accordance with an alternate more specific embodiment of the present invention, the petroleum liquid stabilization process utilizes a fluidized bed heat exchanger which is essentially the same as the above-described fluidized bed heat exchanger except that the present fluidized bed heat exchanger has an external separator and downcomer rather than an internal downcomer. Accordingly, the present fluidized bed heat exchanger operates in essentially the same manner as the above-recited embodiment except that the fluidizable mixture, including the solid hydrate particles, is conveyed to the external separator after withdrawal from the heat transfer zone. The solid hydrate particles are separated from the solid particle medium in the external separator to recover the petroleum liquid product having the hydrate suspended therein. The hydrate is then separated from the petroleum liquid product and the solid particle medium is returned to the heat transfer zone via the external downcomer.

In accordance with another alternate more specific embodiment of the present invention, the petroleum liquid stabilization process utilizes a fluidized bed heat exchanger which is essentially the same as the above-described fluidized bed heat exchangers except that the present fluidized bed heat exchanger lacks a downcomer and has heat transfer tubes extending upward into the separation zone of the fluidized bed heat exchanger. Accordingly, the present fluidized bed heat exchanger operates in essentially the same manner as the above-recited embodiments except that separation of the solid particle medium from the solid hydrate particles and petroleum liquid product is performed in the upper portion of the heat transfer tubes. Thus, the solid particle medium does not recirculate, but remains at all times in the heat transfer tubes.

The present petroleum liquid stabilization process provides a petroleum liquid product which can be stored or transported with diminished health and safety risks, even at relatively low pressures. The petroleum liquid stabilization process can be practiced in a cost-effective and environmentally attractive manner. The petroleum liquid stabilization process can be practiced by means of compact, low-cost, and low-maintenance equipment, which is suitable for operation in remote oil field environments. The equipment can preferably be placed proximal to a wellhead from which a petroleum liquid feed stream can be obtained to avoid extensive storage or transport of the petroleum liquid feed stream before practice of the petroleum liquid stabilization process.

The invention will be further understood from the accompanying drawings and description.

DESCRIPTION OF PREFERRED EMBODIMENTS

Figure 1:
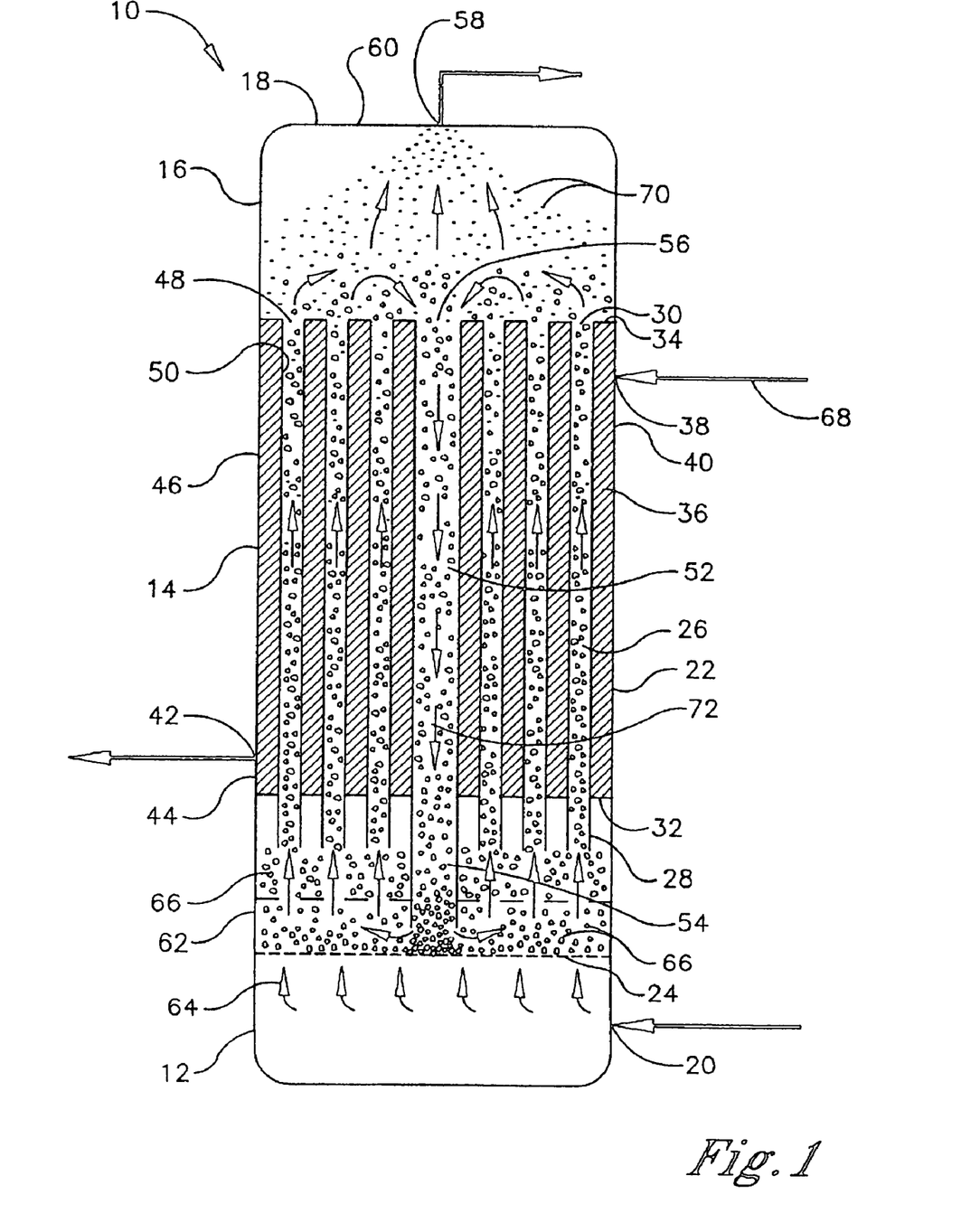
FIG. 1 is a conceptualized cross-sectional view of a fluidized bed heat exchanger having utility in a first embodiment of the petroleum liquid stabilization process of the present invention.

Referring to FIG. 1, a vertically-oriented tubular fluidized bed heat exchanger (FBHX) is shown and designated 10. The FBHX 10 is substantially similar to those disclosed in U.S. Pat. Nos. 3,991,816; 4,220,193; and 4,398,594; incorporated herein by reference. However, the FBHX 10 is specifically adapted for use in the petroleum liquid stabilization process of the present invention. The FBHX 10 is characterized by an internally circulating fluidized bed. The FBHX 10 is functionally partitioned into a plurality of vertically stratified chambers including a lower chamber 12, a middle chamber 14, and an upper chamber 16. The lower chamber 12 is functionally defined as a mixing zone, the middle chamber 14 is functionally defined as a heat transfer zone, and the upper chamber 16 is functionally defined as a separation zone. A shell 18 surrounds the FBHX 10, defining a continuous vessel which encloses the lower, middle, and upper chambers 12, 14, 16.

The chambers 12, 14, 16 are provided with specific elements which enable the above-recited functions. In particular, the lower chamber 12 is provided with a petroleum liquid feed inlet 20 which opens into the lower chamber 12 through a vertical side 22 of the shell 18. A perforated distribution plate 24 is horizontally disposed across the lower chamber 12 above the petroleum liquid feed inlet 20, effectively horizontally bisecting the lower chamber 12. The middle chamber 14 is provided with a plurality of essentially parallel open-ended riser tubes 26 which are vertically disposed within the middle chamber 14. The lower ends 28 of the tubes 26 are open to the lower chamber 12, while the upper ends 30 of the tubes 26 are open to the upper chamber 16. A lower tube plate 32 is positioned proximal to the lower ends 28 at the interface between the lower and middle chambers 12, 14. An upper tube plate 34 is correspondingly positioned proximal to the upper ends 30 at the interface between the middle and upper chambers 14, 16. The tubes 26 are spatially separated from one another, providing an interstitial space 36 between the tubes 26. The lower tube plate 32 and upper tube plate 34 prevent fluid communication between the interstitial space 36 and the lower and upper chambers 12, 16, respectively.

The middle chamber 14 is provided with a heat transfer medium inlet 38 which opens into an upper portion 40 of the middle chamber 14 through the vertical side 22 of the shell 18. The middle chamber 14 is further provided with a heat transfer medium outlet 42 which exits from a lower portion 44 of the middle chamber 14 through the opposite vertical side 46 of the shell 18. The heat transfer medium inlet 38, interstitial space 36, and heat transfer medium outlet 42 define a heat transfer medium flowpath. The heat transfer medium flowpath is in fluid isolation from the lower and upper chambers 12, 16 and the tube interiors 48 which define a fluidizable mixture flowpath. However, the external side of the tube walls 50 is in fluid contact with the heat transfer medium flowpath at the interface between the tubes 26 and the interstitial space 36. An internal downcomer 52 is vertically and centrally disposed within the middle chamber 14. The internal downcomer 52 is in essentially parallel alignment with the tubes 26 and has a substantially greater inside diameter than the tubes 26. The internal downcomer 52 has a lower end 54 which is open to the lower chamber 12 and an upper end 56 which is open to the upper chamber 16. The upper chamber 16 is an essentially open head space or freeboard. The upper chamber 16 is provided with a product outlet 58 which exits from the upper chamber 16 through the top 60 of the shell 18. The product outlet 58 is connected to a solid hydrate/petroleum liquid product separator (not shown).

The present petroleum liquid stabilization process is practiced by feeding a petroleum liquid feed stream to the lower chamber 12 of the FBHX 10 via the petroleum liquid feed inlet 20. The petroleum liquid feed stream is a mixture of a hydrocarbon portion and an aqueous portion. The mixture may also optionally include a hydrate-forming non-hydrocarbon portion. The term "mixture" is used broadly herein to encompass not only strict mixtures, but also solutions, suspensions, emulsions and the like. Furthermore, the petroleum liquid feed stream is characterized in bulk as having the properties of a liquid, although some of the components of the petroleum liquid feed stream may be in a gas state and are dissolved or otherwise entrained in the bulk liquid of the petroleum liquid feed stream.

The hydrocarbon portion of the petroleum liquid feed stream generally comprises a more volatile hydrocarbon portion and a less volatile hydrocarbon portion. The more volatile hydrocarbon portion is alternately characterized as a lower molecular weight hydrocarbon portion or a hydrate-forming hydrocarbon portion. The less volatile hydrocarbon portion is alternately characterized as a higher molecular weight hydrocarbon portion or a hydrate resistant hydrocarbon portion. As a general rule, the more volatile hydrocarbon portion exhibits a significant degree of hydrate formation when contacted with water in the FBHX 10 at conditions described hereafter. Conversely, the less volatile hydrocarbon portion does not exhibit hydrate formation or exhibits only a very limited degree of hydrate formation (i.e., resists hydrate formation) when contacted with water in the FBHX 10 at conditions described hereafter.

The terms "more" and "less" or "higher" and "lower" are used as relative terms herein. The present invention does not necessarily limit the more volatile hydrocarbon portion and the less volatile hydrocarbon portion to components within precise molecular weight or vapor pressure ranges or to specific compounds. Nevertheless, a more particularized characterization of the more volatile hydrocarbon portion and the less volatile hydrocarbon portion are recited hereafter for purposes of illustration.

The more volatile hydrocarbon portion preferably comprises a plurality of hydrocarbon compounds, each compound typically has four or less carbon atoms. As such, the more volatile hydrocarbon portion is preferably made up of compounds selected from the group consisting essentially of methane, ethane, propane, butanes, and mixtures thereof. The less volatile hydrocarbon portion likewise preferably comprises a plurality of hydrocarbon compounds. However, each compound of the less volatile hydrocarbon portion typically has five or more carbon atoms.

Each compound of the more volatile hydrocarbon portion typically has a molecular weight below about 72 and, more preferably, below about 58. Each compound of the more volatile hydrocarbon portion also typically has a vapor pressure above about 100 kPa and, more preferably, above about 300 kPa. Each compound of the less volatile hydrocarbon portion typically has a molecular weight above about 58 and, more preferably, above about 72. Each compound of the more volatile hydrocarbon portion also typically has a vapor pressure below about 300 kPa and, more preferably, below about 100 kPa.

In general, the aqueous portion is any composition which contains or consists entirely of water. For example, the aqueous portion may contain or consist entirely of a fresh water or a brine. The aqueous portion may be indigenous to the petroleum liquid feed stream, i.e., a naturally-occurring water which has not been intentionally added to the hydrocarbon portion by the practitioner, such as a connate water produced with a hydrocarbon from a well in a subterranean hydrocarbon-bearing formation. Alternatively or in addition, the aqueous portion may be non-indigenous to the petroleum liquid feed stream, i.e., an artificially-occurring water which has been intentionally added to the hydrocarbon portion by the practitioner, such as an added make-up water which enables or facilitates formation of a hydrate or enhances the properties of a resulting hydrate, as described hereafter.

The hydrate-forming non-hydrocarbon portion optionally included in the petroleum liquid feed stream comprises one or more compounds which are neither hydrocarbons nor water, but which exhibit a significant degree of hydrate formation when contacted with water in the FBHX 10 at conditions described hereafter. Exemplary compounds of the hydrate-forming non-hydrocarbon portion are selected from the group consisting essentially of carbon dioxide, hydrogen sulfide and mixtures thereof.

The initial stock for the petroleum liquid feed stream is preferably, although not limited to, a hydrocarbon, which is produced to a surface wellhead via a well extending into a subterranean hydrocarbon-bearing formation. Crude oil is an example of such a hydrocarbon. Crude oil is a hydrocarbon mixture comprising a more volatile hydrocarbon portion and a less volatile hydrocarbon portion, thereby satisfying the above-recited criteria for the petroleum liquid feed stream. Crude oil also often includes a hydrate-forming non-hydrocarbon portion and/or an indigenous water such as a brine. A non-indigenous water may be added to the crude oil to complete the petroleum liquid feed stream if the crude oil lacks sufficient indigenous water for hydrate formation as described hereafter.

The petroleum liquid feed stream enters the lower chamber 12 at a rate of about 10,000 to 15,000 kg/hr and a pressure in a range of about 2,500 to 30,000 kPa. The molar ratio of water in the petroleum liquid feed stream is preferably in a range of about 6 to 18 moles of water per mole of the more volatile hydrocarbon portion (and the hydrate-forming non-hydrocarbon portion if present) in the petroleum liquid feed stream.

The petroleum liquid feed stream is conveyed upward through the distributor plate 24 which uniformly distributes the petroleum liquid feed stream radially across an upper portion 62 of the lower chamber 12 as shown by the arrows 64. Immediately after passing through the distributor plate 24, the petroleum liquid feed stream contacts a solid particle medium 66 which resides in the upper portion 62 of the lower section 12. The solid particle medium 66 is a plurality of divided particles formed from an essentially inert, hard, abrasive material, such as chopped metal wire, gravel, or beads formed from glass, ceramic, metal or the like. The petroleum liquid feed stream is conveyed upward through the upper portion 62 at a superficial velocity which substantially entrains the solid particle medium 66 to form a fluidizable mixture comprising the petroleum liquid feed stream and the solid particle medium 66. More particularly, the petroleum liquid feed stream is conveyed through the upper portion 62 at a superficial velocity which is sufficient to fluidize the solid particle medium 66, wherein the petroleum liquid feed stream constitutes the fluidizing medium and the entrained solid particle medium 66 constitutes the fluidized bed.

The fluidizable mixture passes from the lower chamber 12 upward into the open lower ends 28 of the tubes 26 and through the tube interiors 48 within the middle chamber 14. A heat transfer medium is simultaneously conveyed into the middle chamber 14 via the heat transfer medium inlet 38 as shown by arrow 68. The heat transfer medium can be essentially any conventional coolant and is preferably a liquid heat transfer medium selected from among water, glycol-water mixtures, mineral oil, or other conventional commercially available heat transfer liquids or refrigerants. The heat transfer medium enters the middle chamber 14 at a rate of about 20,000 to 30,000 kg/hr, a temperature in a range of about 0 to 20° C., and a pressure in a range of about 100 to 10,000 kPa. The heat transfer medium passes downward through the interstitial space 36 until reaching the heat transfer medium outlet 42 where the heat transfer medium is discharged.

The heat transfer medium is in continuous contact with the external side of the tube walls 50 during its descent through the chamber section 14, while the fluidizable mixture is in continuous contact with the internal side of the tube walls 50 during its ascent through the middle chamber 14. The tube walls 50 are formed from a heat conductive material, which provides an effective heat transfer surface for the petroleum liquid feed stream. The heat transfer medium cools the petroleum liquid feed stream in the middle chamber 14 to a cooled temperature range of about 0 to 20° C. which is below the minimum hydrate formation temperature of the petroleum liquid feed stream. Thus, the heat transfer medium sufficiently cools the petroleum liquid feed stream in the middle chamber 14 to cause hydrate formation. In particular, at least part of the water and more volatile hydrocarbon portion (and the hydrate-forming non-hydrocarbon portion if present) in the petroleum liquid feed stream react to form a plurality of unconsolidated solid hydrate particles 70 in the tube interiors 48.

There is preferably sufficient water in the petroleum liquid feed stream for the hydrate formation reaction to consume essentially all or most of the more volatile hydrocarbon portion (and/or essentially all or most of the hydrate-forming non-hydrocarbon portion if present) in the petroleum liquid feed stream. The resulting solid hydrate particles 70 typically have a crystalline structure within a very small controlled size range of about 0.1 to 1.0 mm which renders the solid hydrate particles 70 relatively benign, i.e., resistant to agglomeration. The solid hydrate particles 70 are likewise entrained in the fluidizing medium as the fluidizable mixture passes upward through the tube interiors 48.

The solid particle medium 66 experiences turbulent flow while it is fluidized within the tube interiors 48, causing the solid particle medium 66 to collide with the internal sides of the tube walls 50 and with the solid hydrate particles 70 entrained in the fluidizable mixture. The collisions produce a scouring action, diminishing the ability of the solid hydrate particles 70 to accumulate on the internal sides of the tube walls 50 and displacing any solid hydrate particles 70 which adhere thereto. Thus, the solid particle medium 66 essentially prevents or reduces fouling or plugging of the tube interiors 48 caused by solid hydrate particle build-up. The collisions also control the ultimate size of the solid hydrate particles 70.

The fluidizable mixture continues out the open upper ends 30 of the tubes 26 into the upper chamber 16. When the fluidizable mixture reaches the upper chamber 16, it disperses causing the more dense solid particle medium 66 to separate by gravity from both the less dense solid hydrate particles 70 and the fluid components remaining from the petroleum liquid feed stream. The remaining fluid components which are not consumed by the hydrate formation reaction are termed the petroleum liquid product.

The solid hydrate particles 70 preferably contain essentially all or most of the more volatile hydrocarbon portion (and essentially all or most of the hydrate-forming non-hydrocarbon portion if present) from the petroleum liquid feed stream. The petroleum liquid product contains essentially all or most of the less volatile hydrocarbon portion of the petroleum liquid feed stream and contains substantially less of the more volatile hydrocarbon portion (and less of the hydrate-forming non-hydrocarbon portion if present) than the petroleum liquid feed stream. The petroleum liquid product is more preferably essentially free of the more volatile hydrocarbon portion and hydrate-forming non-hydrocarbon portion. As such, the petroleum liquid product generally has a lower vapor pressure than the petroleum liquid feed stream. The petroleum liquid product also generally has a broader average molecular weight range. For example, the petroleum liquid product has an average molecular weight in a range from about 90 to 300 and a vapor pressure in a range from about 50 to 350 kPa. By comparison, an exemplary petroleum liquid feed stream has an average molecular weight in a range from about 100 to 280 and a vapor pressure in a range from about 350 to 7000 kPa.

The internal downcomer 52 enables auto-recirculation of the separated solid particle medium 66. In particular, the solid particle medium 66 returns to the lower chamber 12 by falling under the force of gravity from the upper chamber 16 into the axially aligned open upper end 56 of the internal downcomer 52, passing downwardly through the internal downcomer 52, and exiting the internal downcomer 52 via the open lower end 54 into the lower chamber 12 as shown by the arrows 72. The solid hydrate particles 70 remain suspended in the petroleum liquid product and both are withdrawn from the upper chamber 16 via the product outlet 58.

The hydrate and petroleum liquid product suspension is withdrawn from the upper chamber 16 via the product outlet 58 at a rate of about 9,000 to 15,000 kg/hr, a temperature in a range of about 0 to 20° C., and a pressure in a range of about 2,500 to 30,000 kPa. The hydrate and petroleum liquid product suspension exiting the product outlet 58 is fed to the solid hydrate/petroleum liquid product separator for separation of the solid hydrate from the petroleum liquid product by conventional means. The isolated petroleum liquid product may then be conveyed to a storage tank (not shown) for storage at ambient atmospheric pressure or conveyed to a pipeline or a motorized tanker transport vehicle such as a truck or a ship (not shown) for transport at ambient atmospheric pressure. The hydrate may be discarded in a safe and environmentally acceptable manner or further processed to recover any valuable components of the hydrate, such as the more volatile hydrocarbon portion.

Figure 2:
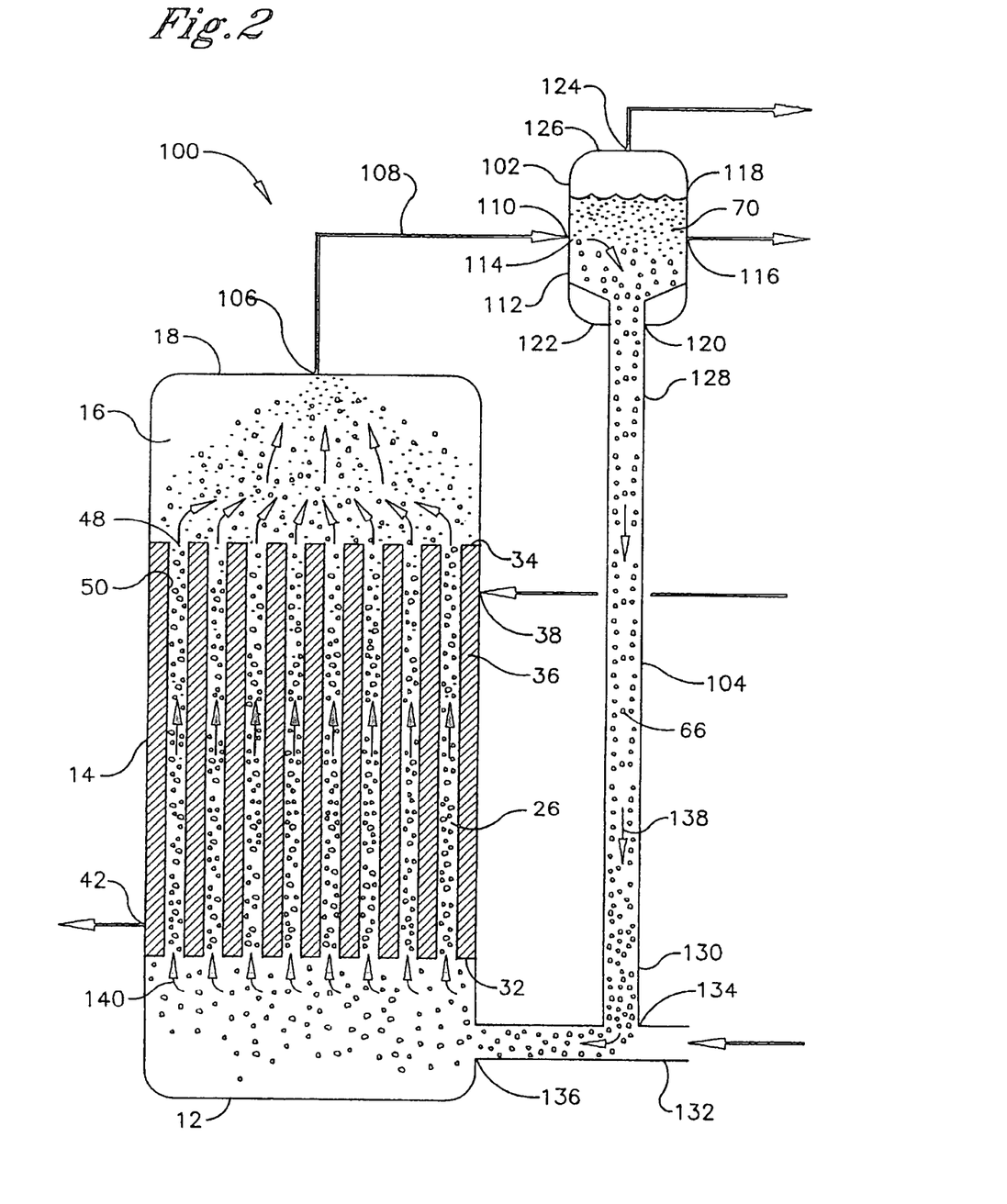
FIG. 2 is a conceptualized cross-sectional view of a fluidized bed heat exchanger having utility in a second embodiment of the petroleum liquid stabilization process of the present invention.

Referring to FIG. 2, an alternate fluidized bed heat exchanger (FBHX) is shown and designated 100. The FBHX 100 is substantially similar to the FBHX 10 shown in FIG. 1, but the FBHX 100 is specifically adapted for use in an alternate embodiment of the petroleum liquid stabilization process of the present invention. Accordingly, elements which are common to both FBHX's 10 and 100 are referred to by the same reference characters. The FBHX 100 is characterized by an externally circulating fluidized bed. As such, the distribution plate and internal downcomer are eliminated and the FBHX 100 is alternatively provided with an external separator 102 and external downcomer 104 in series.

The external separator 102 is in fluid communication with the upper chamber 16 via a fluidizable mixture outlet 106, a fluidizable mixture line 108 and a separator fluidizable mixture inlet 110. The fluidizable mixture outlet 106 is positioned in the FBHX 100 at essentially the same location as the product outlet 58 of the FBHX 10. The separator fluidizable mixture inlet 110 opens through a vertical side 112 into a middle portion 114 of the external separator 102. The fluidizable mixture line 108 extends from the fluidizable mixture outlet 106 to the separator fluidizable mixture inlet 110. The external separator 102 is also provided with a product outlet 116 which opens through the opposite vertical side 118 at essentially the same vertical level as the separator fluidizable mixture inlet 110. A solid particle medium outlet 120 is provided in the bottom 122 of the external separator 102 and a gas vent 124 is provided in the top 126 of the external separator 102. The solid particle medium outlet 120 is integral with an open upper end 128 of the vertically-aligned external downcomer 104. The external downcomer 104 likewise has an open lower end 130 which opens into a petroleum liquid feed line 132 at a tee junction 134. The petroleum liquid feed line 132 provides fluid communication between the external downcomer 104 and the lower chamber 12 of the FBHX 100 via a fluidizable mixture inlet 136 positioned at essentially the same location as the petroleum liquid feed inlet 20 of the FBHX 10.

Operation of the FBHX 100 is substantially similar to that of the FBHX 10 except that the gravity separation of the solid particle medium 66 from the hydrate and petroleum liquid product suspension and the recovery of the hydrate and petroleum liquid product suspension is performed external to the FBHX 100 in the external separator 102, rather than internally as in the FBHX 10. In particular, the fluidizable mixture, which comprises the solid particle medium 66, the solid hydrate particles 70, and the petroleum liquid product is discharged from the upper chamber 16 into the external separator 102 via the fluidizable mixture outlet 106, fluidizable mixture line 108 and separator fluidizable mixture inlet 110. When the fluidizable mixture reaches the external separator 102, it disperses causing the more dense solid particle medium 66 to separate by gravity from the less dense solid hydrate particles 70 and the petroleum liquid product in essentially the same manner as described above with respect to separation in the upper chamber 16.

The hydrate and petroleum liquid product suspension is withdrawn from the external separator 104 via the product outlet 116. The hydrate and petroleum liquid product suspension exiting the product outlet 116 is fed to the solid hydrate/petroleum liquid product separator for separation of the solid hydrate from the petroleum liquid product by conventional means. The resulting separated petroleum liquid product and hydrate are handled in essentially the same manner as described above with respect to the previous embodiment.

The solid particle medium 66 returns to the lower chamber 12 by falling under the force of gravity from the external separator 102 into the vertically aligned open upper end 128 of the external downcomer 104, passing downwardly through the external downcomer 104, and exiting the external downcomer 104 via the open lower end 130 into the petroleum liquid feed line 132 via the tee junction 134 as shown by the arrows 138. The solid particle medium 66 mixes with the petroleum liquid feed stream and is entrained therein to form the fluidizable mixture. The fluidizable mixture enters the lower chamber 12 via the fluidizable mixture inlet 136 and passes from the lower chamber 12 upward through the tube interiors 48 within the middle chamber 14 as shown by the arrows 140. It is noted that the superficial velocity of the petroleum liquid feed stream as it is conveyed through the lower chamber 12 of the FBHX 100 is substantially greater as compared to the FBHX 10 because the superficial velocity in the FBHX 100 must be sufficient to maintain the solid particle medium 66 and solid hydrate particles 70 entrained in the petroleum liquid product until the fluidizable mixture reaches the external separator 102.

Figure 3:
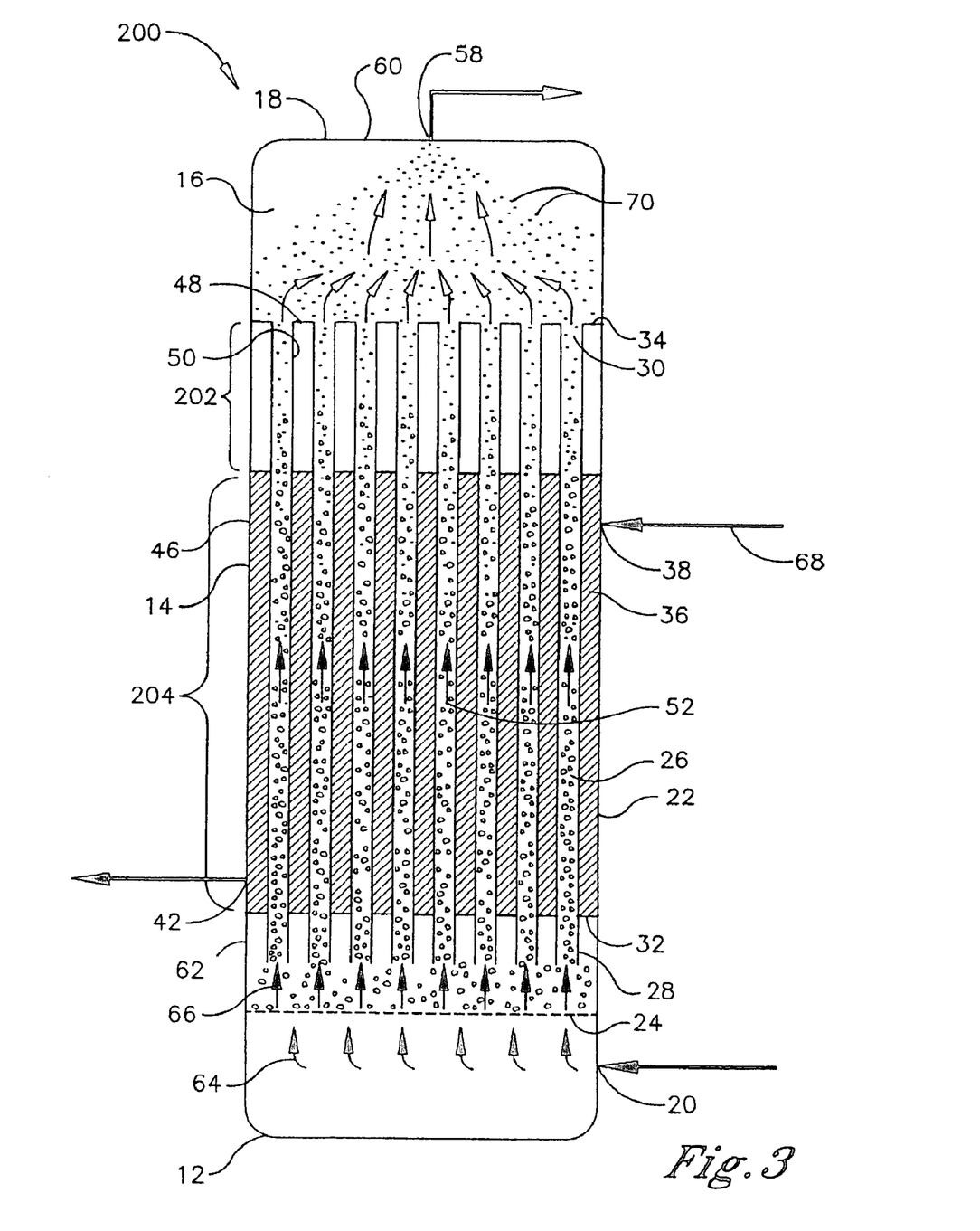
FIG. 3 is a conceptualized cross-sectional view of a fluidized bed heat exchanger having utility in a third embodiment of the petroleum liquid stabilization process of the present invention.

Referring to FIG. 3, another alternate fluidized bed heat exchanger (FBHX) is shown and designated 200. The FBHX 200 is substantially similar to the FBHX 10 shown in FIG. 1, but the FBHX 200 is specifically adapted for use in yet another alternate embodiment of the petroleum liquid stabilization process of the present invention. Accordingly, elements which are common to both FBHX's 10 and 200 are referred to by the same reference characters. The FBHX 200 is characterized by a stationary fluidized bed. As such, the FBHX 200 has no downcomer and the riser tubes 26 extend into the upper chamber 16. The upper portion 202 of the tubes 26 which extends into the upper chamber 16 defines the uncooled separation zone, while the lower portion 204 of the tubes 26 which remains in the middle chamber 14 defines the heat transfer zone.

Operation of the FBHX 200 is substantially similar to that of the FBHX 10 except that gravity separation of the solid particle medium 66 from the solid hydrate particles 70 and the petroleum liquid product is performed in the upper portion 202 of the tube interiors 48, rather than in the freeboard as in the FBHX 10. In particular, the superficial velocity of the bed is reduced by the practitioner in a manner within the purview of the skilled artisan such that the vertical position of each individual particle of the solid particle medium 66 making up the bed remains relatively constant within the middle chamber 14, or at least does not carry past the upper ends 30 of the tubes 26 into the freeboard. Such a bed is characterized as only partially fluidized or "expanded." In other respects, operation of the FBHX 200 is essentially the same as that of the FBHX 10.

While the foregoing preferred embodiments of the invention have been described and shown, it is understood that alternatives and modifications, such as those suggested and others, may be made thereto and fall within the scope of the present invention.

I claim:

1. A process for stabilizing a petroleum liquid comprising:
    entraining a solid particle medium in a petroleum liquid feed stream to form a fluidizable mixture, wherein said petroleum liquid feed stream includes a more volatile hydrocarbon portion, a less volatile hydrocarbon portion and water;
    conveying said petroleum liquid feed stream past a heat transfer surface while contacting said fluidizable mixture with said heat transfer surface, wherein said heat transfer surface is cooler than said petroleum liquid feed stream;
    cooling said petroleum liquid feed stream upon contact with said heat transfer surface to a temperature below a hydrate formation temperature;
    forming a hydrate from at least part of said more volatile hydrocarbon portion and said water;

forming a petroleum liquid product comprising at least part of said less volatile hydrocarbon portion, wherein said petroleum liquid product is less volatile than said petroleum liquid feed stream; and separating said hydrate from said petroleum liquid product.

2. The process of claim 1 wherein said petroleum liquid feed stream includes a hydrate-forming non-hydrocarbon portion.

3. The process of claim 2 further comprising forming said hydrate from at least part of said hydrate-forming non-hydrocarbon portion and said water.

4. The process of claim 2 wherein said hydrate-forming non-hydrocarbon portion comprises a compound selected from a group consisting of hydrogen sulfide, carbon dioxide, and mixtures thereof.

5. The process of claim 1 wherein said more volatile hydrocarbon portion comprises a compound or a mixture of compounds, each having four or less carbon atoms.

6. The process of claim 1 wherein said less volatile hydrocarbon portion comprises a compound or a mixture of compounds, each having five or more carbon atoms.

7. The process of claim 1 wherein said petroleum liquid feed stream is crude oil.

8. The process of claim 1 further comprising separating said hydrate and said petroleum liquid feed stream from said solid particle medium.

9. The process of claim 1 wherein solid particle medium displaces said solid hydrate particles from said heat transfer surface.

10. The process of claim 1 wherein said heat transfer surface is the wall of a tube having a tube interior and a tube exterior.

11. The process of claim 10 wherein said fluidizable mixture is conveyed through said tube interior.

12. A process for stabilizing a petroleum liquid comprising:

cooling a petroleum liquid feed stream to a temperature below a hydrate formation temperature, wherein said petroleum liquid feed stream includes a more volatile hydrocarbon portion, a less volatile hydrocarbon portion and water;

forming a hydrate from at least part of said more volatile hydrocarbon portion and said water;

forming a petroleum liquid product comprising at least part of said less volatile hydrocarbon portion, wherein said petroleum liquid product is less volatile than said petroleum liquid feed stream; and separating said hydrate from said petroleum liquid product.

13. The process of claim 12 wherein said petroleum liquid feed stream includes a hydrate-forming non-hydrocarbon portion.

14. The process of claim 13 further comprising forming said hydrate from at least part of said hydrate-forming non-hydrocarbon portion and said water.

15. The process of claim 13 wherein said hydrate-forming non-hydrocarbon portion comprises a compound selected from a group consisting of hydrogen sulfide, carbon dioxide, and mixtures thereof.

16. The process of claim 12 wherein said more volatile hydrocarbon portion comprises a compound or a mixture of compounds, each having four or less carbon atoms.

17. The process of claim 12 wherein said less volatile hydrocarbon portion comprises a compound or a mixture of compounds, each having five or more carbon atoms.

18. The process of claim 12 wherein said petroleum liquid feed stream is crude oil.

19. A process for stabilizing a petroleum liquid comprising:

providing a fluidized bed heat exchanger having a shell enclosing a heat transfer medium flowpath, a fluidizable mixture flowpath in fluid isolation from said heat transfer medium flowpath, a heat transfer surface in heat communication with said heat transfer medium flowpath and said fluidizable mixture flowpath, and an internal downcomer, wherein said portion of said shell enclosing said heat transfer surface defines a heat transfer zone;

entraining a solid particle medium in a petroleum liquid feed stream to form a fluidizable mixture, wherein said petroleum liquid feed stream includes a more volatile hydrocarbon portion, a less volatile hydrocarbon portion and water;

conveying said heat transfer medium through said heat transfer medium flowpath to cool said heat transfer surface;

conveying said fluidizable mixture through said fluidizable mixture flowpath and contacting said fluidizable mixture with said heat transfer surface in said heat transfer zone, wherein said heat transfer surface is cooler than said petroleum liquid feed stream;

cooling said petroleum liquid feed stream upon contact with said heat transfer surface in said heat transfer zone to a temperature below a hydrate formation temperature;

forming a hydrate from at least part of said more volatile hydrocarbon portion and said water;

forming a petroleum liquid product comprising at least part of said less volatile hydrocarbon portion, wherein said petroleum liquid product is less volatile than said petroleum liquid feed stream;

withdrawing said hydrate, said petroleum liquid product, and said solid particle medium from said heat transfer zone;

separating said hydrate and said petroleum liquid product from said solid particle medium;

separating said hydrate from said petroleum liquid product; and returning said solid particle medium to said heat transfer zone via said internal downcomer.

20. The process of claim 19 wherein said petroleum liquid feed stream includes a hydrate-forming non-hydrocarbon portion.

21. The process of claim 20 further comprising forming said hydrate from at least part of said hydrate-forming non-hydrocarbon portion and said water.

22. The process of claim 20 wherein said hydrate-forming non-hydrocarbon portion comprises a compound selected from a group consisting of hydrogen sulfide, carbon dioxide, and mixtures thereof.

23. The process of claim 19 wherein said more volatile hydrocarbon portion comprises a compound or a mixture of compounds, each having four or less carbon atoms.

24. The process of claim 19 wherein said less volatile hydrocarbon portion comprises a compound or a mixture of compounds, each having five or more carbon atoms.

25. The process of claim 19 wherein said petroleum liquid feed stream is crude oil.

26. A process for stabilizing a petroleum liquid comprising:

providing a fluidized bed heat exchanger having an external separator and an external downcomer and having a shell enclosing a heat transfer medium flowpath, a fluidizable mixture flowpath in fluid isolation from said heat transfer medium flowpath, a heat transfer surface in heat communication with said heat transfer medium flowpath and said fluidizable mixture flowpath, wherein said portion of said shell enclosing said heat transfer surface defines a heat transfer zone;

entraining a solid particle medium in a petroleum liquid feed stream to form a fluidizable mixture, wherein said petroleum liquid feed stream includes a more volatile hydrocarbon portion, a less volatile hydrocarbon portion and water;

conveying said heat transfer medium through said heat transfer medium flowpath to cool said heat transfer surface;

conveying said fluidizable mixture through said fluidizable mixture flowpath and contacting said fluidizable mixture with said heat transfer surface in said heat transfer zone, wherein said heat transfer surface is cooler than said petroleum liquid feed stream;

cooling said petroleum liquid feed stream upon contact with said heat transfer surface in said heat transfer zone to a temperature below a hydrate formation temperature;

forming a hydrate from at least part of said more volatile hydrocarbon portion and said water;

forming a petroleum liquid product comprising at least part of said less volatile hydrocarbon portion, wherein said petroleum liquid product is less volatile than said petroleum liquid feed stream;

conveying said hydrate, said petroleum liquid product, and said solid particle medium to said external separator;

separating said hydrate and said petroleum liquid product from said solid particle medium in said external separator;

separating said hydrate from said petroleum liquid product; and returning said solid particle medium to said heat transfer zone via said external downcomer.

27. The process of claim 26 wherein said petroleum liquid feed stream includes a hydrate-forming non-hydrocarbon portion.

28. The process of claim 27 further comprising forming said hydrate from at least part of said hydrate-forming non-hydrocarbon portion and said water.

29. The process of claim 27 wherein said hydrate-forming non-hydrocarbon portion comprises a compound selected from a group consisting of hydrogen sulfide, carbon dioxide, and mixtures thereof.

30. The process of claim 26 wherein said more volatile hydrocarbon portion comprises a compound or a mixture of compounds, each having four or less carbon atoms.

31. The process of claim 26 wherein said less volatile hydrocarbon portion comprises a compound or a mixture of compounds, each having five or more carbon atoms.

32. The process of claim 26 wherein said petroleum liquid feed stream is crude oil.

33. A process for stabilizing a petroleum liquid comprising:

providing a fluidized bed heat exchanger having a shell enclosing a heat transfer medium flowpath, a fluidizable mixture flowpath in fluid isolation from said heat transfer medium flowpath, and a heat transfer surface in heat communication with said heat transfer medium flowpath and said fluidizable mixture flowpath, wherein said portion of said shell enclosing said heat transfer surface defines a heat transfer zone;

entraining a solid particle medium in a petroleum liquid feed stream to form a fluidizable mixture, wherein said petroleum liquid feed stream includes a more volatile hydrocarbon portion, a less volatile hydrocarbon portion and water;

conveying said heat transfer medium through said heat transfer medium flowpath to cool said heat transfer surface;

conveying said fluidizable mixture through said fluidizable mixture flowpath and contacting said fluidizable mixture with said heat transfer surface in said heat transfer zone, wherein said heat transfer surface is cooler than said petroleum liquid feed stream;

cooling said petroleum liquid feed stream upon contact with said heat transfer surface in said heat transfer zone to a temperature below a hydrate formation temperature;

forming a hydrate from at least part of said more volatile hydrocarbon portion and said water;

forming a petroleum liquid product comprising at least part of said less volatile hydrocarbon portion, wherein said petroleum liquid product is less volatile than said petroleum liquid feed stream;

separating said hydrate and said petroleum liquid product from said solid particle medium; and separating said hydrate from said petroleum liquid product.

34. The process of claim 33 wherein said petroleum liquid feed stream includes a hydrate-forming non-hydrocarbon portion.

35. The process of claim 34 further comprising forming said hydrate from at least part of said hydrate-forming non-hydrocarbon portion and said water.

36. The process of claim 34 wherein said hydrate-forming non-hydrocarbon portion comprises a compound selected from a group consisting of hydrogen sulfide, carbon dioxide, and mixtures thereof.

37. The process of claim 33 wherein said more volatile hydrocarbon portion comprises a compound or a mixture of compounds, each having four or less carbon atoms.

38. The process of claim 33 wherein said less volatile hydrocarbon portion comprises a compound or a mixture of compounds, each having five or more carbon atoms.

39. The process of claim 33 wherein said petroleum liquid feed stream is crude oil.

* * * * *